United States Patent [19]

Hesthamar et al.

[11] Patent Number: 5,386,733
[45] Date of Patent: Feb. 7, 1995

[54] SENSOR AND METHOD FOR MEASURING TORQUE AND/OR AXIAL STRESSES

[75] Inventors: Tore Hesthamar; Fredrick Althoff, both of Mölndal; Thomas Larsson, Västra Frölunda, all of Sweden

[73] Assignee: Scan Sense A/S, Husoysund

[21] Appl. No.: 905,365

[22] Filed: Jun. 29, 1992

[30] Foreign Application Priority Data

Jul. 8, 1991 [SE] Sweden .................. 9102122

[51] Int. Cl.$^6$ .................. G01L 3/00
[52] U.S. Cl. .................. 73/862.333; 73/779
[58] Field of Search .......... 73/862.333–862.336, 73/776, 779

[56] References Cited

U.S. PATENT DOCUMENTS

| | | | |
|---|---|---|---|
| 4,114,428 | 9/1978 | Popenoe | 73/88 F |
| 4,596,150 | 6/1986 | Kuhr | 73/779 |
| 4,760,745 | 8/1988 | Garshelis | 73/862.334 |
| 4,882,936 | 11/1989 | Garshelis | 73/862.36 |
| 5,142,227 | 8/1992 | Fish | 73/779 |

FOREIGN PATENT DOCUMENTS

63-33634 2/1988 Japan .

Primary Examiner—Richard E. Chilcot, Jr.
Assistant Examiner—R. Biegel
Attorney, Agent, or Firm—Burns, Doane, Swecker & Mathis

[57] ABSTRACT

The present invention relates to a sensor and to a method for measuring torque and/or axial stresses applied to an object as well as a method for manufacturing magnetoelastic material to be used therefore. The sensor (20) comprises a magnetoelastic material and a sensing device (210) for non-contactingly sensing changes in permeability of the magnetoelastic material due to torque and/or axial stresses, said sensing device (310) comprising a coil system carrying out both an excitation and a pick-up function. The excitation frequency is so chosen that the pre-dominating process of magnetization of the magnetoelastic material will be small angle magnetization rotation, the excitation frequency being at least 300 kHz.

7 Claims, 9 Drawing Sheets

SENSOR AND METHOD FOR MEASURING TORQUE AND/OR AXIAL STRESSES

TECHNICAL FIELD

The present invention relates to a sensor The invention further relates to a method for measuring torque and/or axial stresses applied to an object as well as a method for manufacturing of magnetoelastic material.

TECHNICAL BACKGROUND

It is well known to measure torque applied to a rotary or fixed shaft by use of magnetoelastic materials which form part of/is arranged on the shaft since it is known that the permeability of magnetic materials changes due to applied stress. The permeabilities of the magnetoelastic materials change due to the fact that a magnetoelastic material changes its magnetic properties when it is subject to tensile and compressive stresses respectively. Therefore, the torque and/or axial stresses to which an object is exposed must either be transmitted to tensile and compressive stresses of the magnetoelastic material which is fastened onto the object or the object itself (or part of it) comprises a magnetoelastic material.

JP-A-166 827/1984 shows a non-contacting torque transducer wherein thin magnetoelastic ribbons are attached to the surface of a shaft where said ribbons form a herring-bone pattern, two pick-up-coils and an excitation coil being used as detecting means. The excitation coil is excited with a frequency of 20 kHz.

Another known non-contacting torque sensor is based on a three-layer principle. The innermost layer, i.e. closest to the shaft comprises a highly permeable non-magnetostrictive amorphous layer whereafter a layer comprising a non-magnetic material follows. The outermost layer comprises a high permeable magnetostrictive amorphous material. An excitation frequency of about 100 kHz is used. More particularly the sensor comprises three layers in order to reduce the sensitivity to stray fields.

In EP-A-0 422 702 a magnetoelastic torque transducer is disclosed which uses an excitation frequency of 1–100 kHz and preferably a frequency of 10–30 kHz i.e. just above the human audible range in order to avoid whistling.

Also in US-A-4 823 620 a magnetostrictive device for measuring torsional torque is shown which likewise use an excitation frequency of 1–100 KHz.

All known torque sensors of this kind suffer the drawback of being sensitive to external magnetic stray fields. This severely limits the use of such sensors, amongst others might even the earth magnetic field influence the signal. When using excitation frequencies of a few tenths of kHz it might be necessary to use advanced shielding devices. An object with the present invention is to provide a sensor having a high sensitivity, is easy to handle and manufacture and has a fast response time. It should further be insensitive to stray fields and withstand various kinds of e.g. dirty or greasy environments. Furthermore it should be usable with a simple coil system i.e. not require a very complicated coil system or similar.

Further problems reside in the fact that the sensors are strongly dependent on temperature. A certain reduction in drift due to temperature can be achieved through carefully keeping the layer of glue or similar by which the magnetoelastic material is applied to the object at an identical and uniform thickness all over the area where it should be used (different thicknesses of the glue layers e.g. under different ribbon belts causes the two output signals to drift differently so that when one signal is subtracted from the other, the final output will drift). Furthermore a certain reduction in temperature dependence can be achieved through fixing the coil bobbin in order to restrict its movements depending on temperature changes. Due to the fact that coil bobbins normally are made of materials which per se have a high coefficient of thermal expansion the coils are displaced when the temperature changes. For a number of applications however, said measures do not imply that the temperature dependence of this sensor is reduced to an acceptable level.

SUMMARY OF INVENTION

Accordingly, an object of the present invention is to provide a sensor which is highly sensitive to applied torque and/or stresses, highly insensitive to stray fields, and which is easy to handle, cheap to manufacture and which does not require complicated sensing devices.

It is also an object of the present invention to provide a method for non-contactingly measuring torque and-/or forces applied to an object. Another object of the present invention is to provide a method for manufacturing magnetoelastic material to be used for measuring torque and/or stresses by the rapid quenching method where the ribbons are produced through etching of the raw material which is an outcome of the rapid quenching. A further object of the present invention is to provide a sensor which to a high degree works independently of temperature.

Preferred embodiments are achieved through the subclaims. According to the invention an excitation frequency of at least 300 kHz should be used, preferably between 500 kHz and 10 MHz and most preferably 1–2 MHz. The waveform of the excitation frequency may be of any form but according to a preferred embodiment it is sinusoidal. In all known sensors a frequency of at most 100 KHz is used and a frequency of 20–30 kHz is within this field regarded as a high frequency. A reason why such considerably higher frequencies give such good results is that the magnetisation process is changed. This makes the sensor signal essentially independent of any normally occurring stray field and furthermore its dependence on the excitation level decreases. As to the magnetization process involved this essentially comprises two basic mechanisms, namely the so called domain wall motion and the magnetization rotation (SAMR-model; Small Angle Magnetization Rotation). At ordinary excitation frequencies and levels the domain wall motion magnetisation mechanism dominates but at higher frequencies or lower excitation level the SAMR-model dominates. This implies that a sensor can operate in essentially two different regions namely region II where the domain wall motion dominates and the region I where the SAMR-model dominates. Upon magnetisation by domain wall motion different areas of parallel spin are increased and decreased in volume respectively and the material is magnetized. A material magnetized by this process requires quite large excitation levels since the walls are pinned down on irregularities in the material but when the level is high enough it suddenly jumps to a new pinning site which gives a very noisy magnetisation behaviour; it is also possible to pump energy into the material by application of stress. The magnetization is further irreversible which means that the material is magnetized even when the exciting field is absent. Domain walls have inertia which means they cannot move infinitely fast. So if the exciting frequency is increased too much the motion of the walls is damped and finally the walls cannot move at all,. If the exciting level is too low there will not be enough energy to move the domain walls and therefore the rotation magnetisation will dominate.

Briefly, when the excitation frequency is high enough or when the excitation level is low enough rotation magnetization will dominate. This magnetization works so that the individual spins are rotated a small angle from the rest positions. This process is reversible and consequently there is no remanent magnetisation when the exciting field is removed. In the region where the rotation magnetisation dominates the permeability is essentially independent of the excitation level which is due to the simply relationship: $\mu \propto \Theta (H)/H$ where $\Theta$ is the rotation angle of the spins and H is the excitation field strength.

The pinning of the domain walls can be described as follows:

$$\beta \frac{dx}{dt} + ax = 2HI_s$$

where $\beta$ is a damping parameter, $a$ is an elastic spring coefficient and $2HI_s$ is the force per unit area on the domain wall. Solving the equation gives:

$$x(t) = x_0 e^{i\omega t}$$

where $$x_0 = \frac{2HM_s}{a} \cdot \frac{1}{1 + \frac{i\omega}{\omega_o}} \text{ and } M_s = \text{saturation magnetization}$$

Further, $\omega$ is the excitation frequency, $$\omega_o = \frac{a}{\beta}.$$

There is a threshold amplitude above which the domain wall is torn away from its pinning site, $$x_t = \frac{2H_{c1} M_s}{a}.$$

$H_{c1}$ is the coercive field when $\omega = o$.

The co-pending patent applications No. 07/905,374, "Sensor system" and No. 07/905,366, "Surveillance system" of the same filing date concern special embodiments and applications essentially based on the same principle. According to the invention a temperature compensation is done through measuring the temperature on the ribbons whereafter the temperature is compensated for either mathematically or electronically. The particular way in which a temperature compensation is carried out depends on the application. According to the invention it is possible to measure the temperature of the ribbons using the ribbon belts. Either separate ribbons or bands might be used on the ribbon belts for the torque and/or stress measurements may be used. To this object one or more further ribbon belts can be mounted in such a way on the object that they will not be exposed to the same stresses etc. as the object itself are exposed to and which are to be measured and at the same time subtract the stresses which are due to thermal expansion. This can then be measured in an analoug way. In this way the stresses due to thermal expansion can be distinguished from the other stresses. Depending on application those further ribbons belts or bands can be mounted in different ways. Compensation for the temperature dependence of the magnetoelastic material may in some cases be accounted for by using a sensitive (magnetoelastic material) having a temperature coefficient more or less equal to that of the material of the object of measurement.

BRIEF DESCRIPTION OF THE DRAWINGS

The invention will now be further described referring to the accompanying drawings wherein.

DESCRIPTION OF PREFERRED EMBODIMENTS

Figure 1:
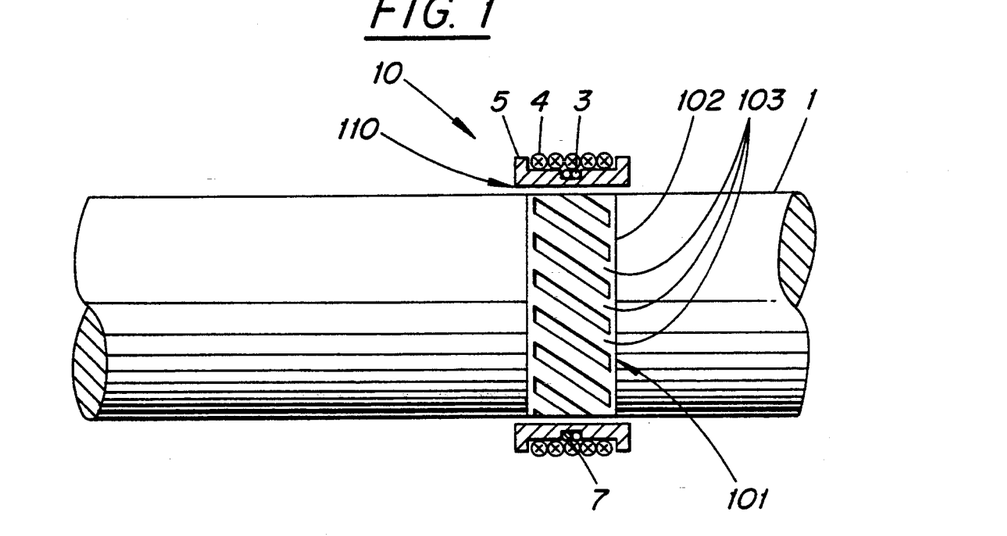
FIG. 1 illustrates a shaft with a magnetoelastic ribbon belt attached thereto and a pick up coil and an excitation coil on a common bobbin.

In FIG. 1 the sensor means 101 comprises a magnetoelastic ribbon belt 102 which is attached to the object (shaft 1) said ribbon belt having a pattern of ribbons 103 etched in an angle of 45° in relation to the longitudinal direction of the ribbon belt 102, the ribbons 103 forming the pattern being applied in 45° relative to the longitudinal direction of the shaft 1. The ribbon belt 102 is encompassed by a pick-up coil 3 and an excitation coil 4 both coils being wound around one and the same coil bobbin 5 which has a turned down groove 7 for taking up the pick-up coil 3. FIG. 1 further illustrates that the width of the groove 7 for the pick-up coil 3 is considerably less than that for the ribbon belt 102.

Generally the torsional torque cannot be distinguished from axial stresses if one coil/one ribbon belt is used. On other hand, torsional torque can be measured if two ribbon belts/pick-up coils are connected serially and in opposition whereas if two ribbon belt/pick-up coils are connected serially in phase axial stresses (forces) and temperature can be measured.

Figure 2:
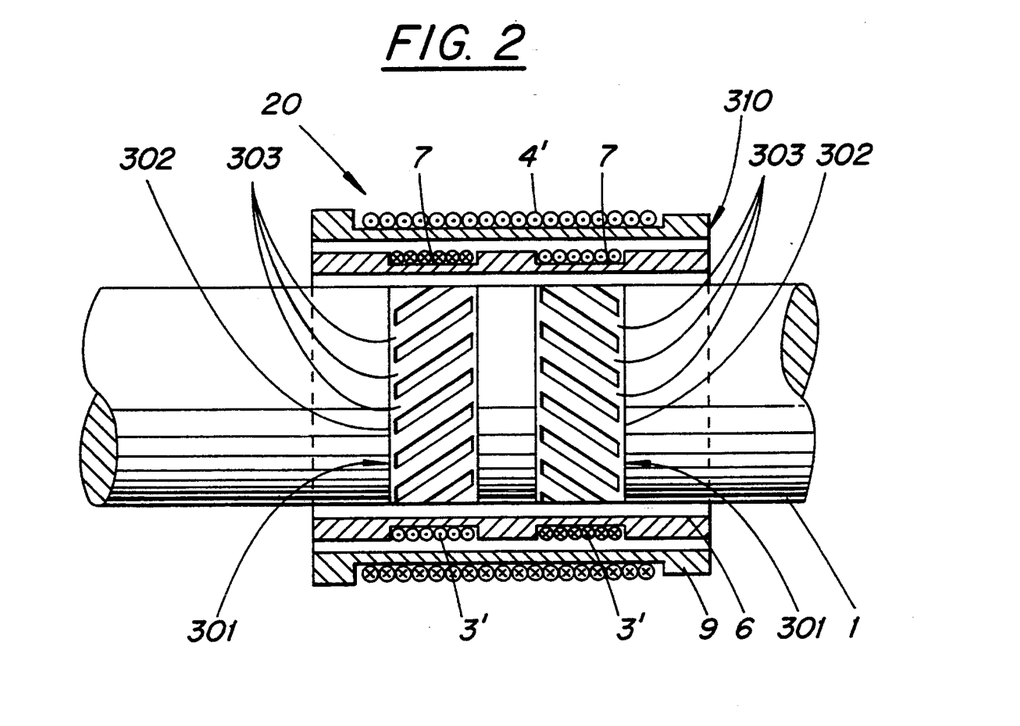
FIG. 2 illustrates a shaft with two magnetoelastic ribbon belts and two pick-up-coils and an excitation coil respectively on different bobbins.

In FIG. 2 a further embodiment is shown where a shaft 1 comprises two magnetoelastic ribbon belts 202, 202 the pattern of which is obtained through etching and wherein the ribbons 303 forms an angle of approximately 90° in relation to the ribbons 303 in the other ribbon belt 302, the ribbons 303 forming an angle of approximately 45° with the longitudinal axis of the object 1. The pick-up coils 3' and the excitation coil 4' respectively are wound on separate bobbins 6, 9.

Figure 3:
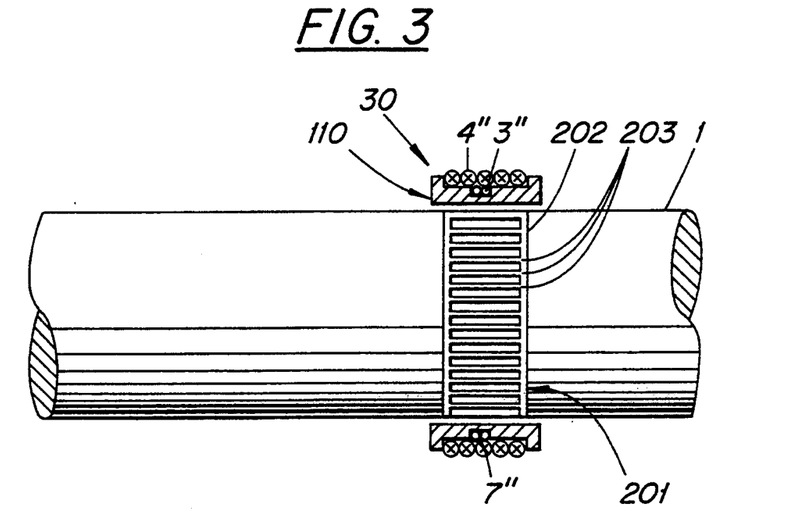
FIG. 3 illustrates a shaft with a ribbon belt with ribbons etched out forming an angle of approximately 0° in relation to the longitudinal axis of the object, shaft or similar, FIG. 4 illustrates a shaft with two ribbon belts and two pick up coils and an excitation coils on a common coil bobbin.

In a third embodiment according to FIG. 3 the principle can be applied for measuring axial stresses. A ribbon belt 302 is thereby so applied to the shaft 1 that the ribbons 303 form an angle of approximately 0° with the longitudinal direction of the shaft 1.

Figure 4:
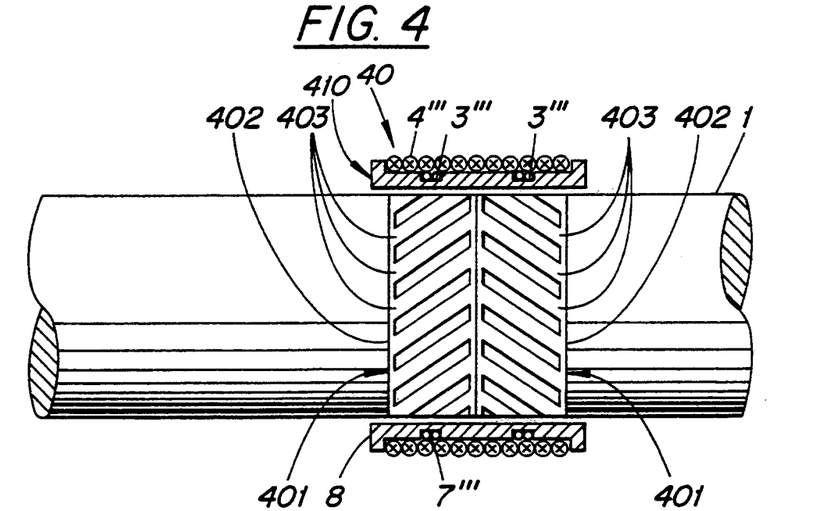
Figure 5:
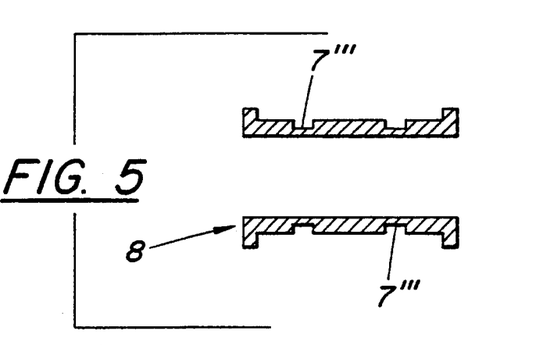
FIG. 5 illustrates a coil bobbin intended for taking up an excitation coil as well as two pick up coils, grooves being turned out for the pick-up-coils.

In FIG. 4 two ribbon belts 402, 402 are shown, the pattern of each ribbon belt 402 forming 90° with the pattern of the other ribbon belt 402. Each ribbon belt 402 is encompassed by a pick-up coil 3''' around which an excitation coil 4''' is wound. In this case a common coil bobbin 8 is used for both the two pick-up coils 3''' and the excitation coil 4'''. The bobbin 8 itself is shown separately in FIG. 5, the grooves 7''' for the two pick-up coils 3''', 3''' being visible.

For torque measurements below reference is only done to FIG. 4 but of course this is also valid for the other sensors e.g. two ribbon belts 402, 402 may be attached onto and around the shaft 1 whereby further a pick-up coil 3''' is wound around each ribbon belt 402, 402. An excitation coil 4''' is wound around the two pick-up coils 3'''. Then an AC-current is sent through the excitation coil 4''' where upon a magnetic field is created there around 4''' and a so called transformer coupled coil system is obtained. This means that through feeding the excitation coil 4''' with a current, a voltage is induced in pick-up coils 3''' which is proportional to the coupling factor between the excitation coil 4''' and the pick-up coils 3'''. The coupling factor between the excitation coil and the pick-up coils is given by the number of turns of the coils, the distance between the coils and the magnetic properties of an eventually present core. According to the invention the magnetoelastic ribbons act as cores of the pick-up coils. The relationship between the voltages can be shown by the following formulas:

$$U_1 = (k_1 \cdot \mu_1 + m_1) U$$

$$U_2 = (k_2 \cdot \mu_2 + m_2) U$$

$$\mu_u = \frac{Ms}{2K_u - 3\lambda_s \sigma_i}$$

U being the voltage of the excitation coils, $k_1$, $k_2$ being constants, $U_1$ and $U_2$ respectively being the voltages of the pick-up coils and $\mu$ being the permeability of the material, K and $\lambda$ being constants characteristic of the material while $\sigma$ is the mechanical tension to which the material is exposed $m_1$, $m_2$ being constants. Consequently the voltage out from the pick-up coils will depend on the mechanical tension to which the material is exposed. The ribbons 403 are etched in 45° angle relative to the longitudinal axis of the shaft 1 in order to obtain a maximal tension and compression of the ribbons 403. It furthermore appears to be of great importance that the ribbons 403 form a symmetric angle in the relation to a centre line. If the ribbons 403 form an angle other than 45° they will be less tensioned/compressed and the sensitivity of the sensor will decrease. The sensitivity of the sensor also depends on the particular material that is used in the ribbons 403. It has proven to be advantageous to use an amorphous magnetoelastic material. The sensitivity of those materials varies from one material to another.

The excitation coil 4''' preferably comprises only a few turns (20-50). Moreover the wire should have quite a large diameter or be provided with a relatively thick isolation layer. This is to keep the capitance between the wire windings at a low level. In order to reduce the effects of the capacitance which may arise when using high excitation frequencies the coil comprises merely one or a few layers. (According to the invention a particularly convenient excitation frequency has shown to be 1-2 MHz). Also the pick-up coils 3''', 3''' merely comprise a few turns (approximately 5-20) but for geometrical reasons the diameter of this wire is smaller. As far as the coil bobbin 5; 6; 8; 9 is concerned it should be made of a material which as far as possible meets the requirements of the particular environment in which the particular bobbin 5; 6; 8; 9 is to be used, i.e. it has to be adapted to environment e.g. as far as heat, resistance to grease etc. is concerned. Due to the fact that the grooves 7''' in the bobbin 8 are considerably thinner than corresponding magnetoelastic ribbon belt, see FIGS. 4 and 5 (for example the grooves can have a width of about 1 millimeter whereas the ribbon belt may have a width of about 8 millimeters). The sensitivity to axial distortion will be considerably reduced and the coil system could be displaced somewhat around the centering position without the signal being influenced.

Figure 6:
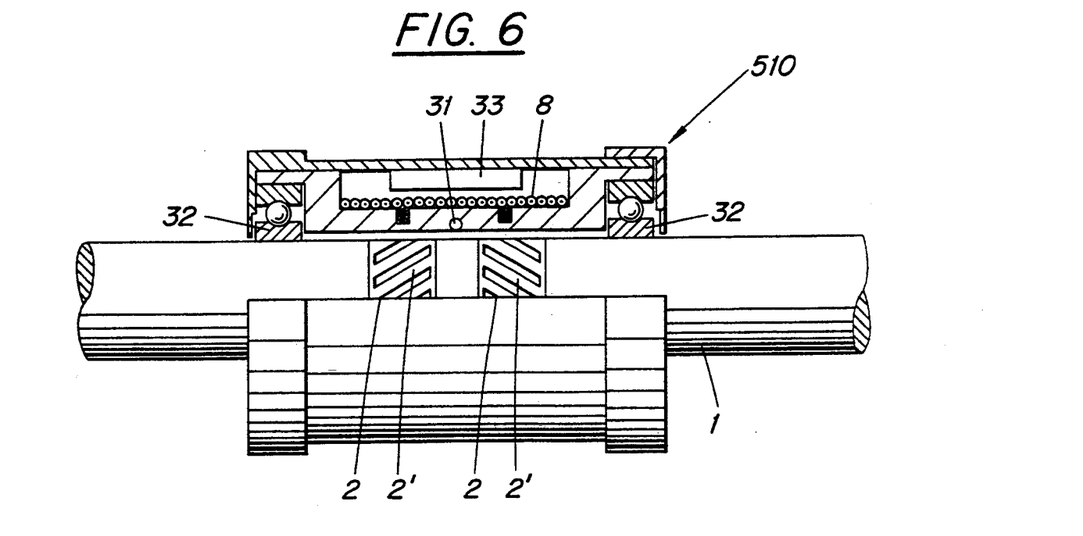
FIG. 6 shows a shaft with two ribbon belts, a coils system and two bearings.

FIG. 6 shows a substantially complete system for measuring torque where 32 are the bearings, 33 illustrates modulating electronics. If desired it is possible to use an ordinary temperature probe 31 said probe 31 being mounted inside the bobbin close to the axis.

Figures 7A, 7B, 7C:
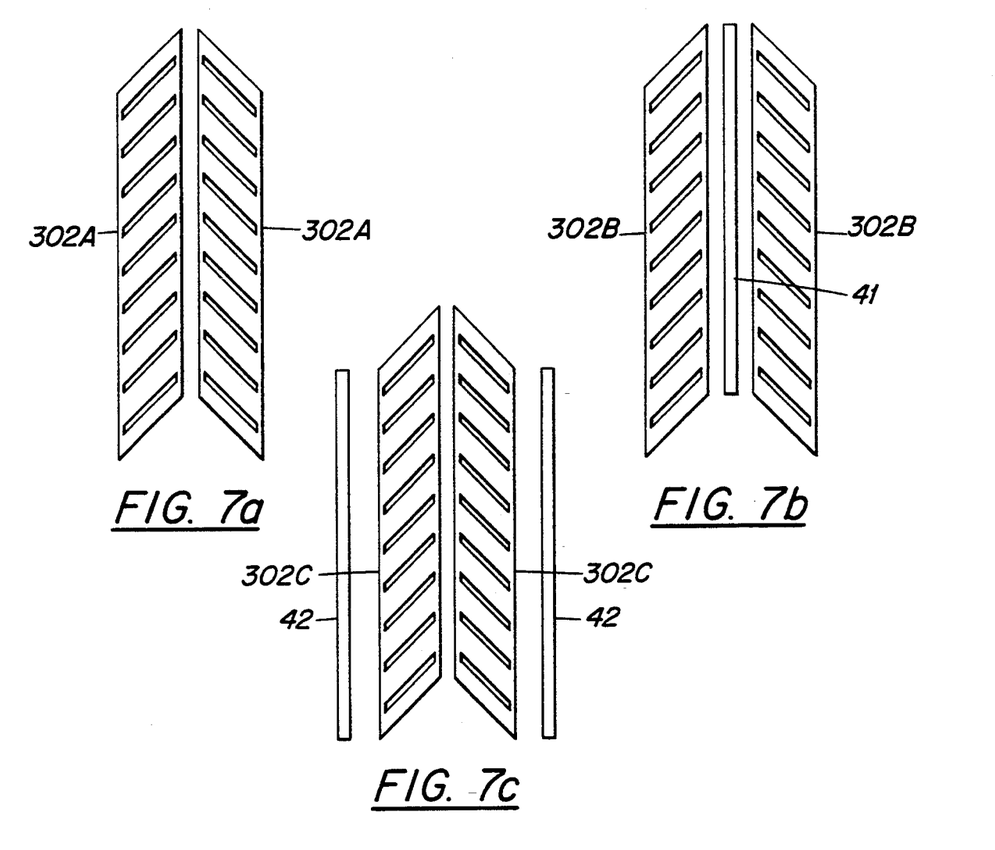
FIG. 7a illustrates two ribbon belts.
FIG. 7b illustrates two ribbon belts with an intermediate band for temperature compensation.
FIG. 7c illustrates two ribbon belts surrounded by two bands or ribbons.

FIG. 7a, illustrates the ribbon belts 302A, 302A for torque measurements without any compensation for temperature apart from the compensation that is obtained through an identical glueing of the ribbons 303A which furthermore must have an identical geometry. If this is complied with, temperature change (0-gradient) and an axial stress should have the same influence on both ribbon belts 302A, 302A. This means that the output signal will be 0 with a serial connection in opposition as mentioned above.

FIG. 7b illustrates how an extra ribbon or band 41 of an amorphous magnetoelastic material (which also may comprise axial ribbons; not shown) is placed between the two ribbon belts 302B, 302B intended for measuring of torque and/or axial stresses. In this case the temperature can be measured continuously but there is no possibility to measure a temperature gradient over the ribbon belts 302B, 302B. If this is necessary two extra bands 42, 42 (with or without axial ribbons) of an amorphous material maybe arranged on each opposite side of the two ribbon belts 302C, 302C as illustrated in FIG. 7C. Therethrough it gets possible to take into account a temperature which varies over the ribbon belts 302C, 302C which variation can be compensated for e.g. via electrical feed-back or a purely numerical compensation through a computer.

An explanation to why the magnetoelastic, preferably amorphous magnetoelastic material or even merely magnetostrictive in combination with a high excitation frequency give such good results will be given in the following.

Figure 8:
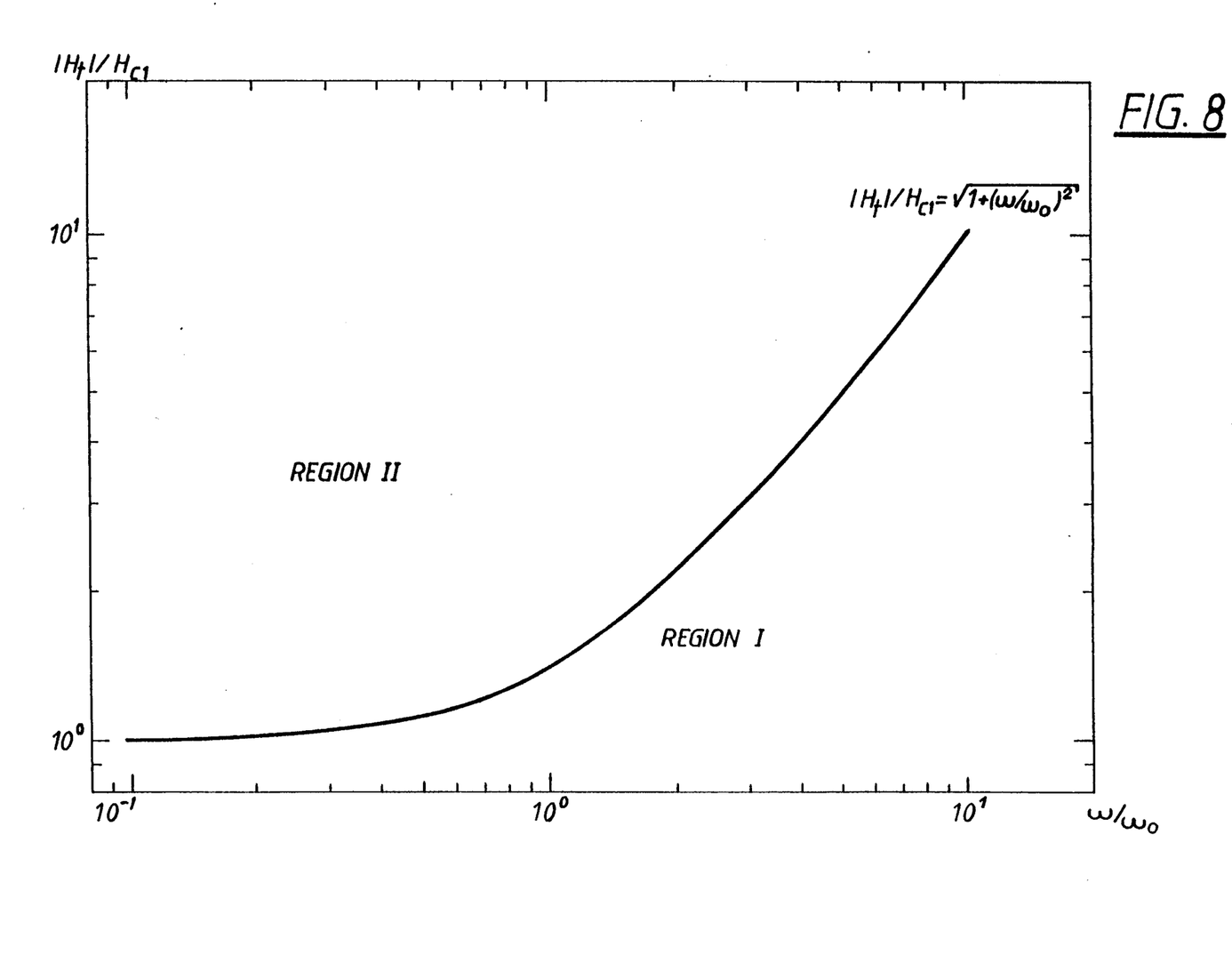
FIG. 8 illustrates the regions for domain wall motion and magnetisation rotation respectively.
Figure 9A:
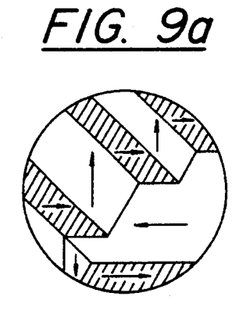
FIG. 9 is an illustration of domain wall displacement and rotation magnetisation.
Figure 9B:
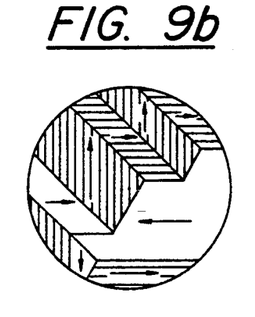
Figure 9C:
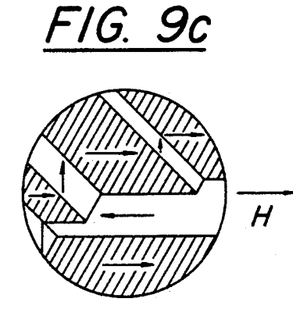
Figure 9D:
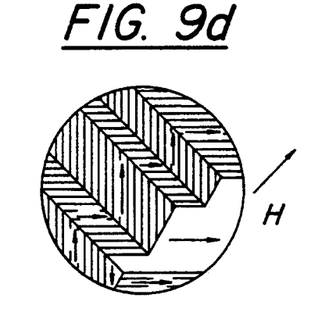
Figure 9E:
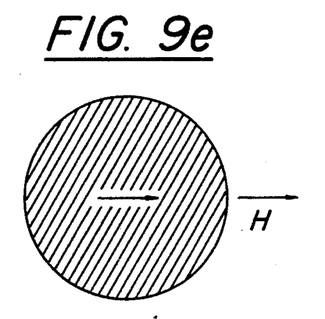
Figure 9F:
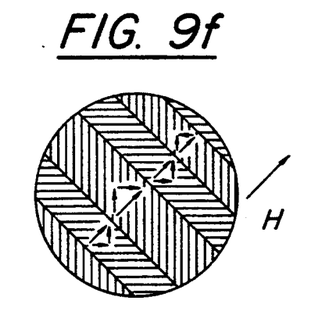

In the following it is referred to-an amorphous material, it being understood that it is also magnetoelastic although it does not have to be amorphous. The magnetic properties of the amorphous material depend on the frequency with which the material is excited. FIG. 8 illustrates the two different mechanisms occurring in the magnetization process, where region 1 designates the region in which magnetization rotation (SAMR-model) dominates where as region 2 indicates the region in which the domain wall motion dominates. The excitation frequency on the X-axis is normalized through division by a material dependent constant and the expression for the "normalized" exciting field, H, is given by the expression $$\left| \frac{H_t}{H_{c1}} \right| = \sqrt{1 + \frac{(\omega)^2}{\omega_o}}$$

where $\omega$ is the excitation frequency, $\omega_o$ is a threshold frequency, $$\omega_o = \frac{\alpha}{\beta},$$

$H_{c1}$ is the coercive field when $\omega = o$, $H_t$ is a threshold driving field strength.

All cited prior art sensors work in region II i.e. in the region in which the domain wall motion dominates (it might also be possible to use a very high exciting level and a low frequency, i.e. even in this case one would enter into region I but this is of no practical interest). The basics of the domain wall magnetization is shortly described above and in FIG. 9 a simplified illustration is shown. On the top to the left a randomized system is shown, i.e. zero magnetization whereas in the middle to the left, with an applied field of a normal frequency the walls have started to line up in the direction of the field where as finally all the domain walls have lined up in the direction of the field or the material is saturated. To the right the material is entered into region I where rotation magnetization dominates which is illustrated by the small arrows in the figure forming an angle with the field direction. As explained previously, the domain walls can not move infinitely fast and therefore, if the exciting frequency is too high, the motion of the domain walls is damped and in the end they can not move at all. If the exciting level is low, there will not be enough energy to move the domain walls and therefore the rotation magnetization will dominate, hence, when the excitation frequency is high enough (or the excitation level is low enough) the rotation magnetization dominates whereby, as illustrated in FIG. 9, the individual spins are rotated a small angle from their rest positions and this is a reversible process as mentioned above and thus no magnetization remains after the exciting field has been removed unlike domain wall motion which is an irreversible process.

Figure 10:
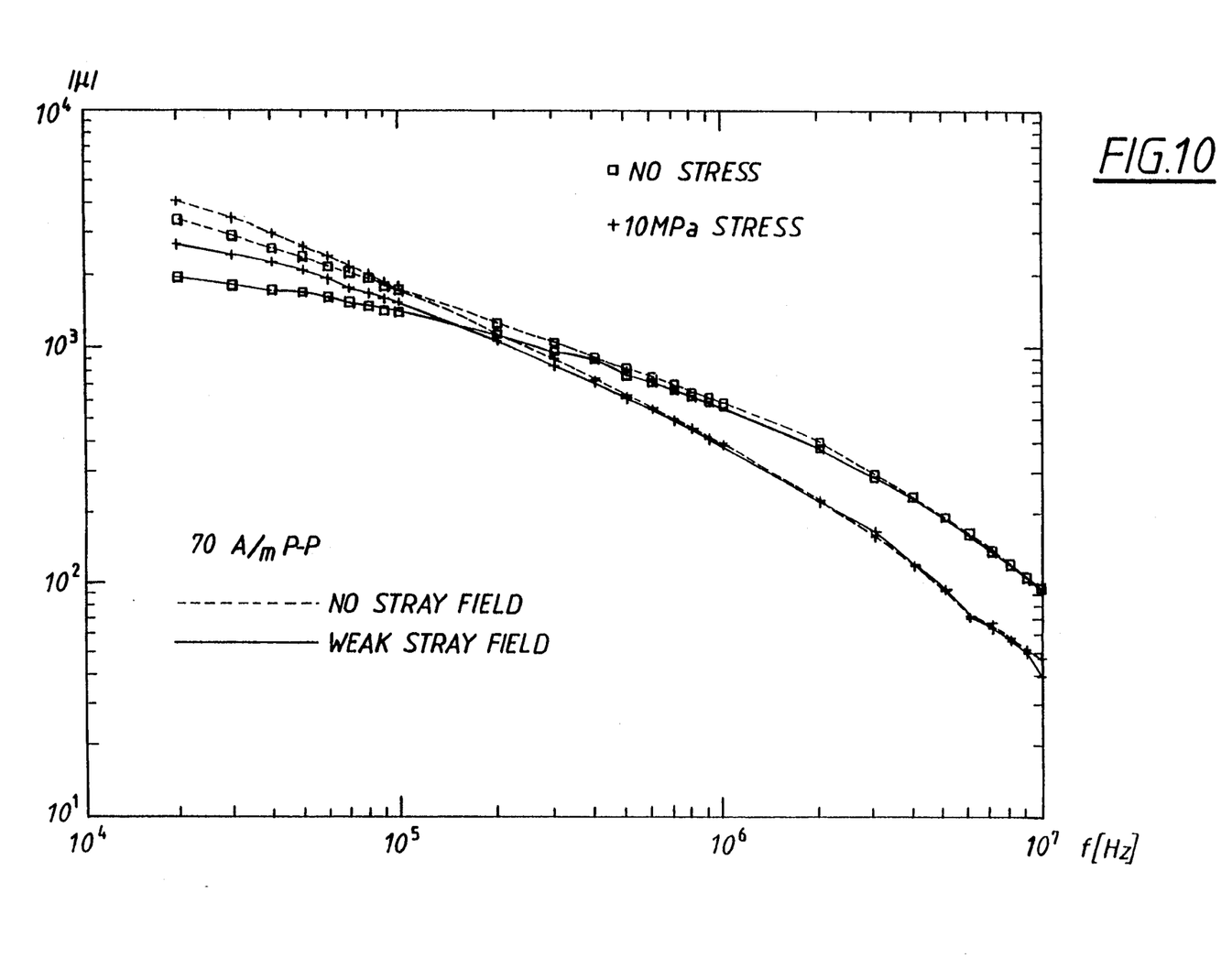
FIG. 10 is an illustration of the sensitivity to stress as well as to stray fields at different frequencies.

FIG. 10 is an illustration of the sensitivity to stress and to stray fields when working with frequencies in approximately the range from 20 kHz up to 10 MHz where the absolute value of the permeability is depicted against the frequency. It can be seen from the figure that after about 300 kHz a change in behaviour gradually occurs, the difference due to stray fields almost completely vanishing since the curves indicating no stray field (dashed line) and a weak stray field almost coincide whereas at lower frequencies they are split up. Furthermore, the sensitivity to stress increases which can be seen from the fact that the curves relating to no stress (small rectangles) and to a stress of 10 MPa (crosses) differ more at high frequencies than at low frequencies which is a measure of the sensitivity.

Figure 11:
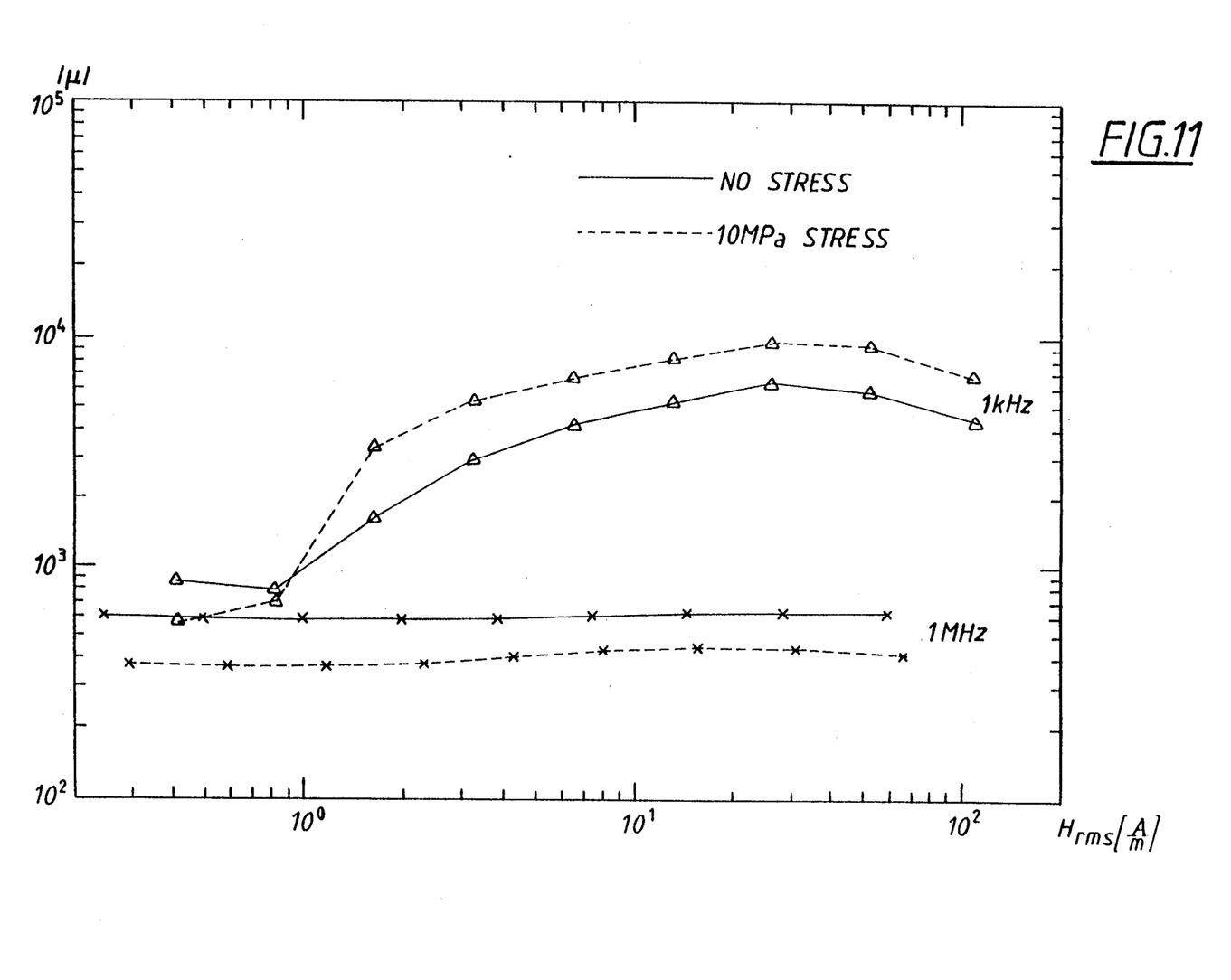
FIG. 11 illustrates a.o. the permeability dependence on excitation level for two different excitation frequencies.

In FIG. 11 the permeability dependence on excitation level for two different excitation frequencies, 1 kHz and 1 MHz respectively is shown, full line indicating no stress, dashed line indicating a stress of 10 MPa for both frequencies, triangles relating to 1 kHz frequency and X relating to 1 MHz frequency. It can be seen from the figure that, when an excitation frequency of 1 MHz is used, i.e. corresponding to region I) the permeability is essentially independent of excitation level. On the other hand, when an excitation frequency of about 1 kHz is used, thus in the region for domain wall motion, the permeability is strongly dependent on the excitation level, i.e. on the excitation field.

It can furthermore be said that the signal in the region where domain wall motion dominates normally is quite noisy due to interstitials which it costs a certain amount of energy to overwin. This is not the case in the SAMR-region.

Figure 12:
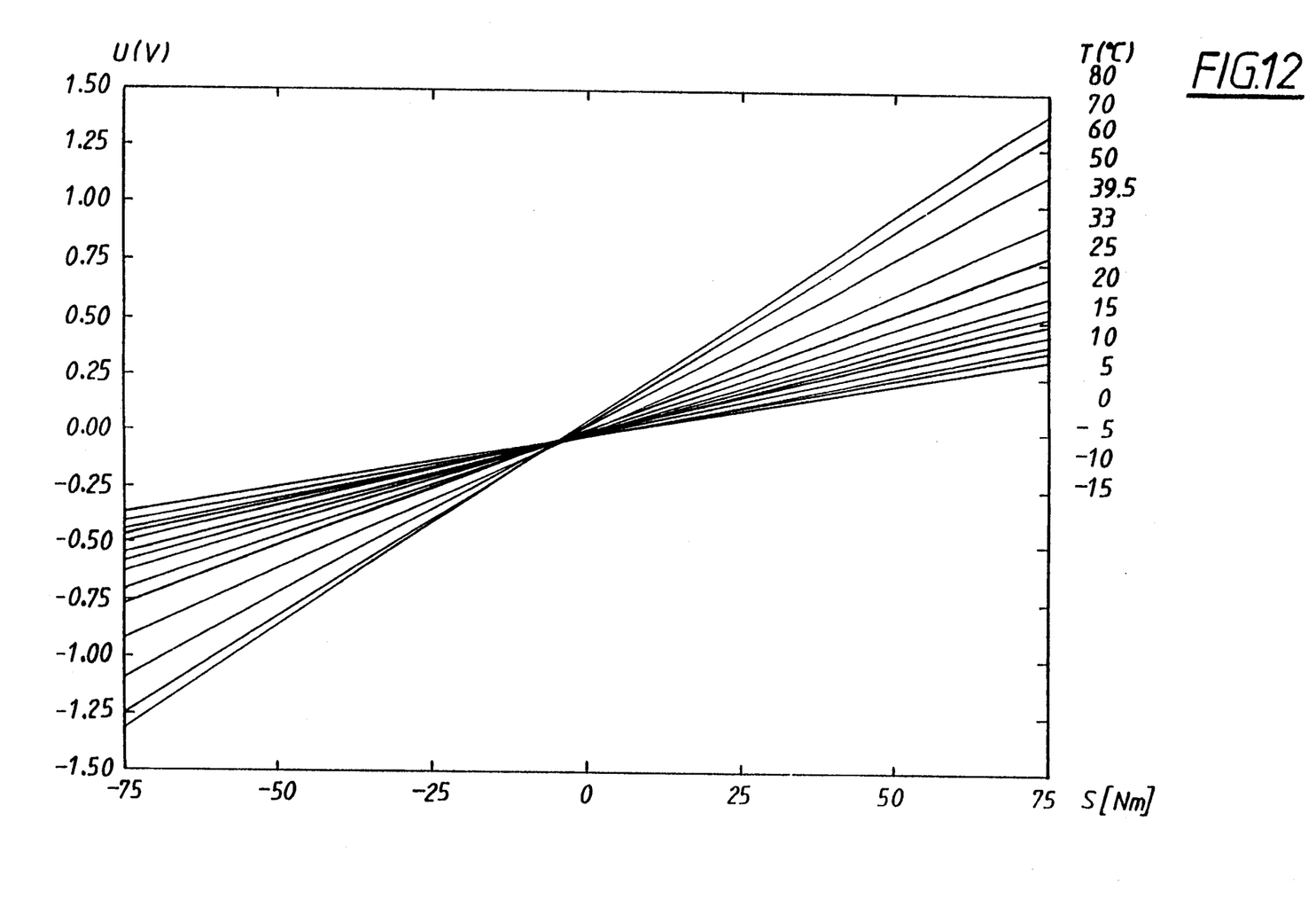
FIG. 12 is an illustration of output signals for varying torque and a number of different temperatures.

A further problem to which the invention relates refers to the temperature dependence of the sensor. Since the amorphous material is glued onto the object at an elevated temperature and because of the difference in the temperature coefficient it is arranged on the object, e.g. the shaft, in a pre-stressed state which influences the permeability as the operating temperature is higher. By measuring the sum of the pick-up signals instead of the difference it is possible to get a signal which has a linear dependence on temperature. This signal can be used as a temperature probe and can thereafter be used in compensating electronics. Due to the movements of the pick-up signals the differentiated signal (the torque signal) will get a sensitivity which increases with increased temperature which is illustrated in FIG. 12 where the sensor output (in volts) is depicted against the torque is for different temperatures. Since the change in temperature coefficient is exponential and has a good repeatability it is possible to make an electronic compensation circuit.

Figure 13:
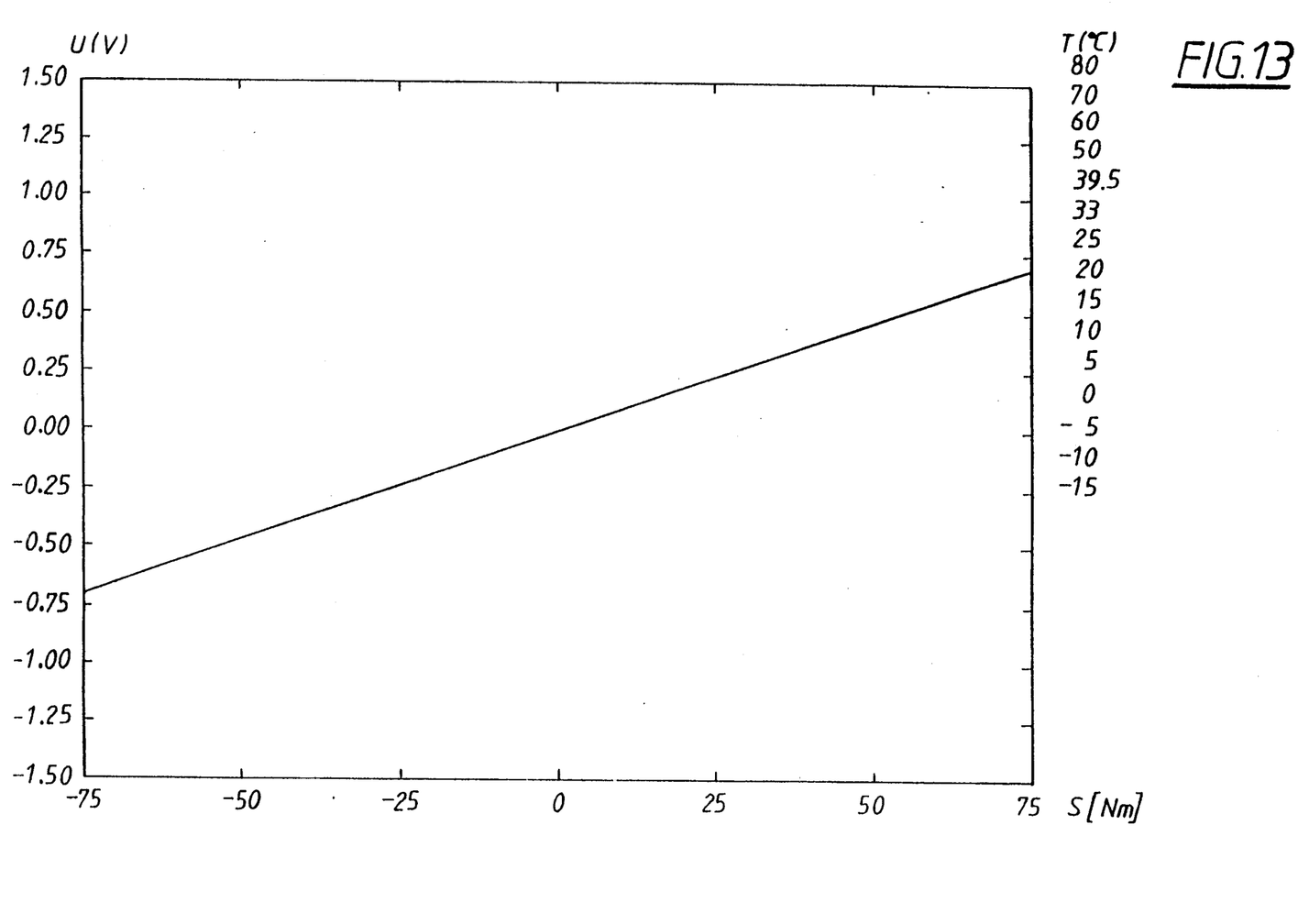
FIG. 13 is an illustration of output signals for varying torque with compensation for a number of different temperatures.

In FIG. 13 a temperature compensated output signal is shown.

However, instead of using magnetoelastic ribbons based on Fe as is normally the case, it is also possible to use magnetoelastic ribbons based on e.g. Ni. As an example the Ni-based material (2826 MB, allied signal, Metglas ® 2826) has a temperature coefficient which is similar to that for steel which means that this material is only to a very slight degree effected by a change of temperature. On the other hand this means that the material can only be used in one direction, i.e. either for measuring compressive or tensile stresses. However, since the Ni-based material has a slightly higher temperature coefficient than steel it can be pre-stressed if glued at a highly elevated temperature and it could be used in both tensile and compressive mode. However, the temperature which is required to glue it onto the object is quite high, it might go up to as much as 200° C. or more.

A way to measure temperature with the amorphous material will be discussed hereinafter. In a torque sensor the two pick-up coils generate a signal which is proportional to the strains in the amorphous material, the signal from one of the pick-up coils increasing as the other decreases. By taking the difference between the two pick-up signals it is possible to enhance the sensitivity of the sensor.

If an axial strain component is present this is eliminated by taking the difference of the signals since such a component gives rise to the same signal change in both pick-up coils. Furthermore, by taking the difference of the signals a zero drift which is present in the pick-up coils signal is eliminated since it gives a drift in the same direction in both pick-up coils.

However, the sensitivity dependence on ambient temperature is not being accounted for in the same way. To enable that, the temperature have to be measured whereafter either of a mathematical compensation in a computer or an electronical compensation has to be done. Accordingly, according to one embodiment, in order used to measure the temperature, a temperature probe is needed: either an ordinary probe, for instance Pt 100 elements (not non-contactinly) may be used or the ribbons and the coil systems themselves might be used. The last alternative makes it possible to measure the temperature on the object non-contactingly and without the addition of any extra ribbons. By adding the pick-up signals instead of taking the difference the signal will not be dependent on torque but only on temperature and the axial strain component. Furthermore, if there is no axial strain component present it is possible to use it as a temperature probe. This can be done because of the zero drift in the pick-up signals. The torque applied to the sensor is thereby insignificant since the torque signals from the pick-up coils respectively will cancel out. This is due to the fact that the signals of the different pick-up coils 30 in different directions when a torque is applied to the object.

The temperature signal is linear within the same torque interval as the torque signal itself and as a consequence of this it can be used to control a variable amplifier to account for the sensitivity changes.

Temperature compensation is further discussed in the co-pending patent application No 07/405,366 "Surveillance System", disclosing a particular electronical compensation by using two voltage dividers including each an (identical) diode, the output signal from each of the voltage dividers being fed to two amplifiers with different gain and to a differential amplifier to amplify each signal by an appropriate factor in order to have the two signals cancel each other.

The present invention further relates to a method for manufacturing of magnetoelastic material. Using prior art sensor with an excitation frequency of about 20 kHz it was very important how the etched pattern was located since it was of the utmost importance to obtain a "easy axis" direction for the domain walls. The domain walls direction is dependent on the manufacturing direction. As to the present invention, whith an excitation frequency which is higher and where the magnetization process is dominated by the so called magnetization rotation, i.e. region I, it is not necessary to line up the domain walls in any particular direction and consequently the manufacturing direction is of no importance. This means that the raw material can be used much more economically and in a more efficient way e.g. when referring to an on-line process for putting the ribbons on the shaft or similar.

This invention can be used in a number of different fields, e.g. when it is desired to measure the torsional torque in a rotating shaft, on drills and so on, by measuring torque and axial strains or stresses on bolts etc.

The invention is however not limited to the shown embodiments but can be varied in a number of ways without departing from the scope of the claims.

We claim:

1. Method for measuring forces applied to a non-magneto elastic object, said method comprising the following steps:
    providing the object, with sensor means comprising a magnetoelastic material,
    attaching said sensor means onto the object prior to applying the forces to the object,
    arranging a sensing device to at least partly encompass or cover the sensor means, said sensing device comprising a coil system for carrying out both an excitation and a pick-up function,
    using an excitation frequency such that the predominating process of magnetization of the magnetoelastic material is small angle magnetization rotation.

2. Method according to claim 1, wherein an excitation frequency of between 500 kHz to 10 MHz is used.

3. Method according to claim 1, wherein an excitation frequency of 1–2 MHz is used.

4. Method according to claim 1, wherein the magnetoelastic material is applied directly onto the object through sputtering or chemical deposition whereafter ribbons are obtained in the material through etching.

5. Method according to claim 1, wherein the magnetoelastic material is applied directly onto the object by use of masking and consequent sputtering whereby ribbons are caused directly in the magnetoelastic material without any etching or similar.

6. Method according to claim 1, wherein the magnetoelastic material is made by so called rapid quenching, magnetoelastic ribbons being so formed as to be held together in a ribbon belt through etching, said etching being performed in an arbitrary direction in relation to the manufacturing direction of the material, said ribbons/ribbon belts being attached to the object 7. Method according to claim 1, wherein the sensor means is attached to the non-magneto elastic object with glue.

* * * * *